US012504708B2

(12) United States Patent
Hayayumi

(10) Patent No.: US 12,504,708 B2
(45) Date of Patent: Dec. 23, 2025

(54) IMAGE FORMING APPARATUS WITH A DOOR PROVIDED WITH CONDUCTIVE PORTIONS

(71) Applicant: CANON KABUSHIKI KAISHA, Tokyo (JP)

(72) Inventor: Fumihiko Hayayumi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/662,149

(22) Filed: May 13, 2024

(65) Prior Publication Data

US 2024/0385567 A1 Nov. 21, 2024

(30) Foreign Application Priority Data

May 19, 2023 (JP) ................................ 2023-083038

(51) Int. Cl.
*G03G 21/16* (2006.01)

(52) U.S. Cl.
CPC ..... *G03G 21/1638* (2013.01); *G03G 21/1619* (2013.01); *G03G 21/1652* (2013.01); *G03G 2221/169* (2013.01)

(58) Field of Classification Search
CPC ........... G03G 21/1638; G03G 21/1619; G03G 21/1652; G03G 2221/169; G03G 21/1633
See application file for complete search history.

(56) References Cited

U.S. PATENT DOCUMENTS 10,627,772 B2 4/2020 Suzuki
2013/0077986 A1* 3/2013 Mori .................. G03G 21/1652 399/90
2023/0125825 A1* 4/2023 Haruta ............... G03G 21/1619 399/220

FOREIGN PATENT DOCUMENTS

JP 2007187815 A 7/2007
JP 2017108018 A 6/2017

* cited by examiner

*Primary Examiner* — Sandra Brase
(74) *Attorney, Agent, or Firm* — ROSSI, KIMMS & McDOWELL LLP

(57) ABSTRACT

An image forming apparatus includes a conductive frame, a first support portion that is provided on the frame and is conductive to the frame, a door configured to be opened such that an inside of the image forming apparatus is accessed, the door including a metal portion, a second support portion that is conductive to the metal portion, is pivotably connected to the first support portion about a pivot shaft, and is configured to support the door, and a contact portion that is conductive to the metal portion and comes into contact with and is conductive to the first support portion in a case where the door is in a closed state, and a holding mechanism configured to hold the door in the closed state.

10 Claims, 11 Drawing Sheets

IMAGE FORMING APPARATUS WITH A DOOR PROVIDED WITH CONDUCTIVE PORTIONS

BACKGROUND OF THE INVENTION

Field of the Invention

The present invention relates to an image forming apparatus such as a printer, a copier, a facsimile machine, or a multifunction peripheral.

Description of the Related Art

In an image forming apparatus such as a printer, a copier, a facsimile machine, or a multifunction peripheral, an openable and closable door is provided in an apparatus body. An operator can access the inside of the apparatus body by opening the door to perform an operation such as replacement or cleaning of various units accommodated in the apparatus body or removal of a recording material clogged in a conveyance path. The door is pivotably attached to the apparatus body by a hinge (JP 2007-187815 A). On a free end side of the door, for example, a holding mechanism that enables holding of the door in a closed state onto the apparatus body by a magnet is provided (JP 2017-108018 A). In a case where the door is made of a resin, a reinforcing sheet metal for securing durability and stiffness of the door is attached to a back surface of the door.

SUMMARY OF THE INVENTION

According to a first aspect of the present invention, an image forming apparatus configured to form an image on a recording material, the image forming apparatus includes a conductive frame, a first support portion that is provided on the frame and is conductive to the frame, a door configured to be opened such that an inside of the image forming apparatus is accessed, the door including a metal portion, a second support portion that is conductive to the metal portion, is pivotably connected to the first support portion about a pivot shaft, and is configured to support the door, and a contact portion that is conductive to the metal portion and comes into contact with and is conductive to the first support portion in a case where the door is in a closed state, and a holding mechanism configured to hold the door in the closed state.

Further features of the present invention will become apparent from the following description of exemplary embodiments with reference to the attached drawings.

DESCRIPTION OF THE EMBODIMENTS

In a case where a door is made of metal or a door made of resin is reinforced by a reinforcing sheet metal, it is necessary to ground (earth) the door. This is because if the conductors are not grounded, the conductors may function as an antenna that receives and re-radiates electromagnetic waves (referred to as radiation noise) generated from an electronic circuit, a motor, or the like and transmitted in the air. Hitherto, a hinge mechanism having conductivity is used, and a lower end surface of a cylindrical upper tubular portion to which a hinge pin is fitted in a support plate attached to an apparatus body and an upper end surface of a cylindrical lower tubular portion to which a hinge pin is fitted in a hinge plate attached to a door and pivotable with the hinge pin as a pivot shaft with respect to the support plate are in contact with each other to ensure grounding.

However, when the door is held in a closed state by a holding mechanism, the lower end surface of the upper tubular portion and the upper end surface of the lower tubular portion may not come into contact with each other with an electrically sufficient contact pressure. That is, in a state where the door is opened, a sufficient contact pressure is applied to the lower end surface of the upper tubular portion and the upper end surface of the lower tubular portion by the weight of the door. However, in a case where the holding mechanism holds the door in a state where the door is closed, there is a possibility that a minute gap is generated between the lower end surface of the upper tubular portion and the upper end surface of the lower tubular portion, and grounding of the metal door is thus not sufficiently performed. In addition, a configuration in which grounding is ensured by additionally fixing a member such as a ground wire with a screw is also conceivable, but there is a possibility that it is difficult to remove the door and maintainability is deteriorated.

First Embodiment

Image Forming Apparatus

Figure 1:
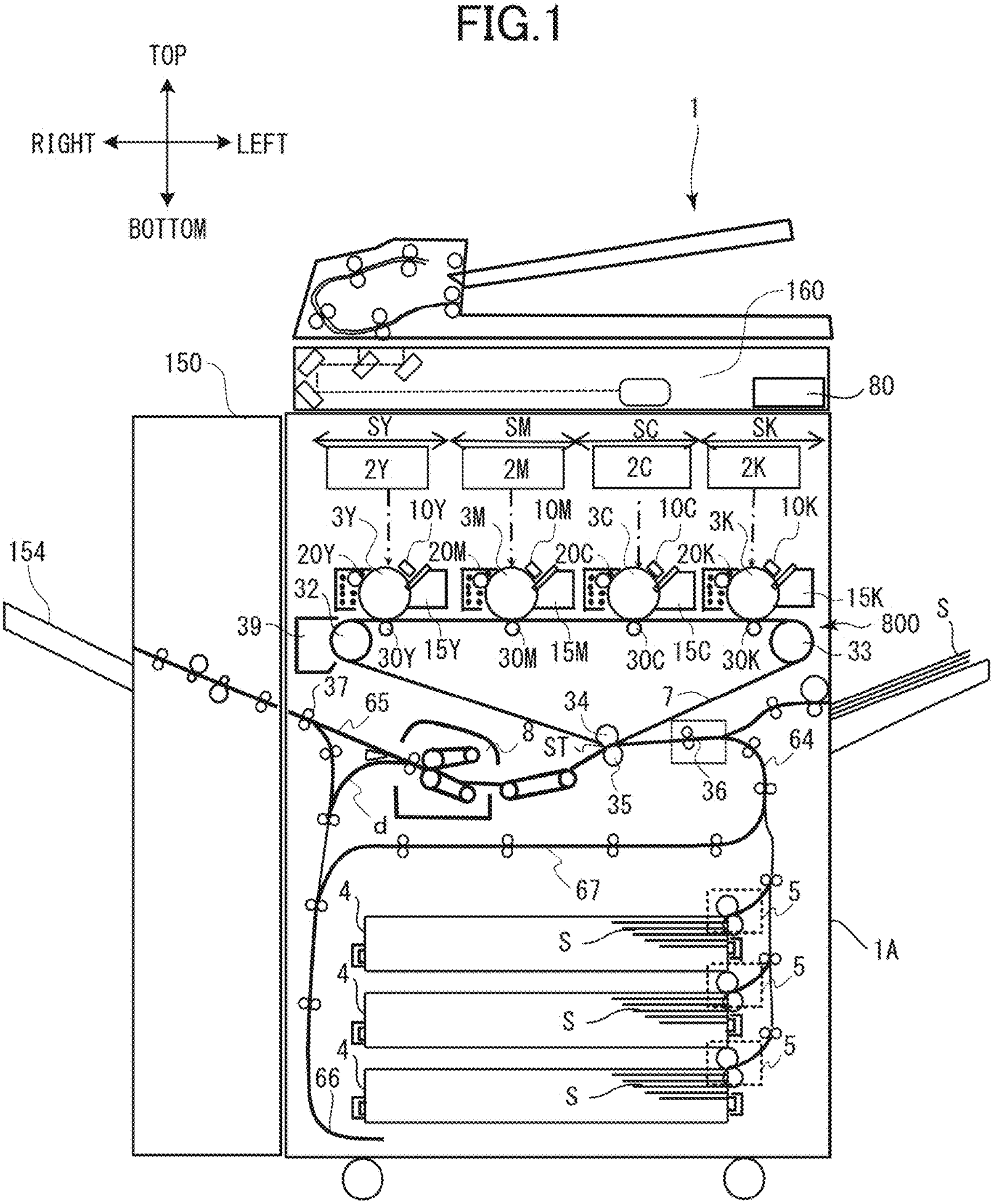
FIG. 1 is a schematic view illustrating an image forming apparatus according to the present embodiment.

Hereinafter, the present embodiment will be described. First, an image forming apparatus according to the present embodiment will be described with reference to FIGS. 1 to 3C. As illustrated in FIG. 1, an image forming apparatus 1 is an electrophotographic full-color printer, and includes an apparatus body 1A. The apparatus body 1A includes a document reading apparatus 160 that reads image information of a document, an operation unit 80 including a display unit capable of displaying various types of information and a key capable of inputting various types of information according to an operator's operation, and the like. In the present specification, a side on which an operator stands when operating the operation unit 80 is referred to as a "front surface", and a side opposite to the front surface is referred to as a "back surface". FIG. 1 illustrates the image forming apparatus 1 when viewed from the front.

The image forming apparatus 1 according to the present embodiment is an intermediate transfer type full-color printer in which image forming units SY, SM, SC, and SK that are accommodated in the apparatus body 1A and form yellow, magenta, cyan, and black toner images are disposed to face an intermediate transfer belt 7. The image forming apparatus 1 forms a toner image on a recording material S according to image data from the document reading apparatus 160 provided above the apparatus body 1A or an external device (not illustrated) such as a personal computer. Examples of the recording material S include sheet materials such as paper, a plastic film, and cloth. Note that the image forming units SY to SK may be provided in the apparatus body 1A so as to be detachable from the front by the operator.

A conveyance process for the recording material S in the image forming apparatus 1 will be described. The recording materials S are accommodated so as to be loaded in one or more (here, three) cassettes 4, and are supplied to a conveyance path 64 one by one by a supply roller 5 in accordance with an image forming timing. The recording material S supplied by the supply roller 5 is conveyed to a registration roller 36 disposed in the middle of the conveyance path 64. Then, skew correction and timing correction for the recording material S are performed in the registration roller 36, and the recording material S is conveyed to a secondary transfer portion ST. The secondary transfer portion ST is formed by an inner secondary transfer roller 34 and an outer secondary transfer roller 35 facing each other with the intermediate transfer belt 7 interposed therebetween, and is a nip portion that transfers the toner image from the intermediate transfer belt 7 onto the recording material S by applying a predetermined pressure and a secondary transfer bias.

A process of forming an image sent to the secondary transfer portion ST at the same timing as that of the process of conveying the recording material S to the secondary transfer portion ST will be described. First, the image forming units SY to SK will be described. However, since the image forming units SY to SK of the respective colors are basically the same except for the color of the toner, the image forming unit SK of black will be described below as an example.

The image forming unit SK mainly includes a photosensitive drum 3K serving as a photosensitive member, a charging device 10K, a developing device 20K, a drum cleaner 15K, and the like. A surface of the photosensitive drum 3K rotated by a drive motor (not illustrated) is uniformly charged in advance by the charging device 10K, and then an electrostatic latent image is formed by an exposing device 2K driven based on image data. The developing device 20K develops the electrostatic latent image formed on the photosensitive drum 3K with a toner contained in a developer. As a result, a toner image is formed on the photosensitive drum 3K.

Thereafter, a predetermined pressure and a primary transfer voltage are applied by a primary transfer roller 30K disposed to face the image forming unit SK with the intermediate transfer belt 7 interposed therebetween, and the toner image formed on the photosensitive drum 3K is primarily transferred to the intermediate transfer belt 7. A residual primary transfer toner remaining on the photosensitive drum 3K after the primary transfer is collected by the drum cleaner 15K.

The intermediate transfer belt 7 is an endless belt stretched by a tension roller 32, a driving roller 33, and the inner secondary transfer roller 34, and moved at a speed corresponding to a rotational speed of the photosensitive drums 3Y to 3K by the driving roller 33 rotationally driven by a motor or the like. The process of forming images of the respective colors processed in parallel by the image forming units SY to SK of the respective colors described above is performed at a timing at which the toner images of the colors primarily transferred to the intermediate transfer belt 7 upstream in a moving direction are sequentially superimposed. As a result, a full-color toner image is finally formed on the intermediate transfer belt 7 and conveyed to the secondary transfer portion ST. A residual secondary transfer toner remaining on the intermediate transfer belt 7 after passing through the secondary transfer portion ST is collected from the intermediate transfer belt 7 by a belt cleaner device 39. The primary transfer rollers 30Y to 30K, the intermediate transfer belt 7, the tension roller 32, the driving roller 33, the inner secondary transfer roller 34, the belt cleaner device 39, and the like may be provided as an intermediate transfer belt unit 800 in the apparatus body 1A so as to be detachable from the front by the operator.

By the conveyance process and the image forming process described above, the timings of the recording material S and the full-color toner image coincide with each other in the secondary transfer portion ST, and secondary transfer in which the toner image is transferred from the intermediate transfer belt 7 to the recording material S is performed. Thereafter, the recording material S is conveyed to a fixing device 8, and the fixing device 8 applies heat and pressure to fix the toner image to the recording material S.

In a single-sided mode in which a toner image is formed only on one side of the recording material S, the recording material S to which the toner image is fixed by the fixing device 8 is guided to a discharge conveyance path 65 and discharged to the outside of the apparatus body 1A by a discharge roller 37. On the other hand, in a duplex mode in which toner images are formed on both surfaces of the recording material S, the recording material S to which a toner image is fixed by the fixing device 8 is reversed by a reverse conveyance path 66 and then conveyed toward the registration roller 36 through a duplex conveyance path 67. Thereafter, the recording material S undergoes a process similar to that in the single-sided mode, a toner image is formed on the other surface of the recording material S by the fixing device 8, is then guided to the discharge conveyance path 65, and is finally discharged to the outside of the apparatus body 1A by the discharge roller 37. In the present embodiment, since a finisher unit 150 that performs post-processing such as stapling processing on the recording material S discharged from the apparatus body 1A is connected to the apparatus body 1A, the recording material S subjected to the post-processing by the finisher unit 150 is placed on a discharge tray 154.

Figure 2:
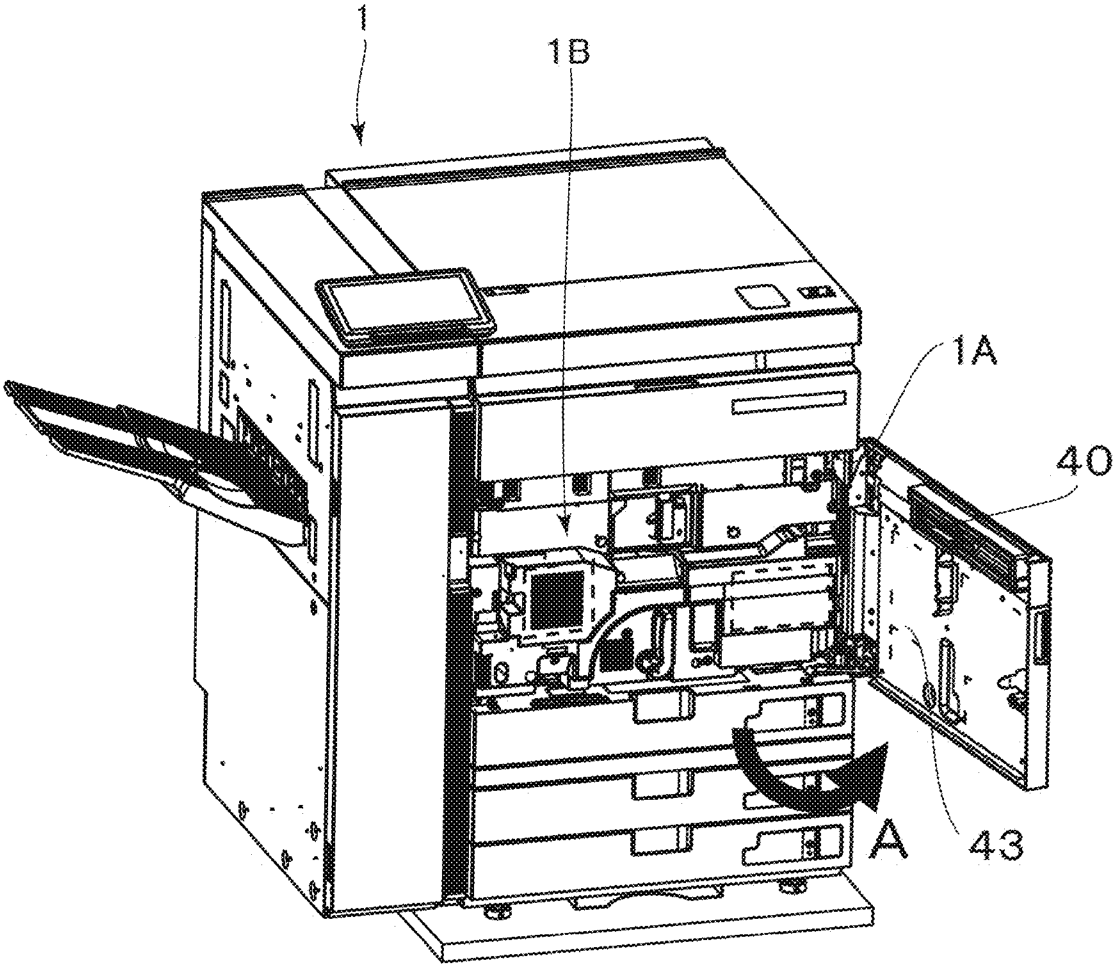
FIG. 2 is a perspective view illustrating a state where a front door is opened.

The apparatus body 1A is made of metal, and includes a plurality of frames such as a front plate on a front side, a rear plate provided on a back side and supporting the image forming units SY to SK together with the front plate, a stay connecting the front plate and the rear plate, and a support column supporting the front plate and the rear plate. As illustrated in FIG. 2, an opening portion 1B is formed in the apparatus body 1A, and a front door 40 whose surface is a part of a body exterior is openably provided at the opening portion 1B. The front door 40 is formed of, for example, a non-conductive member such as a resin, and a reinforcing sheet metal 43 serving as a metal portion is attached to a back surface of the front door 40 in order to secure durability and stiffness of the front door 40. The front door 40 may be made of metal, and in this case, the reinforcing sheet metal 43 does not have to be attached.

Figure 4:
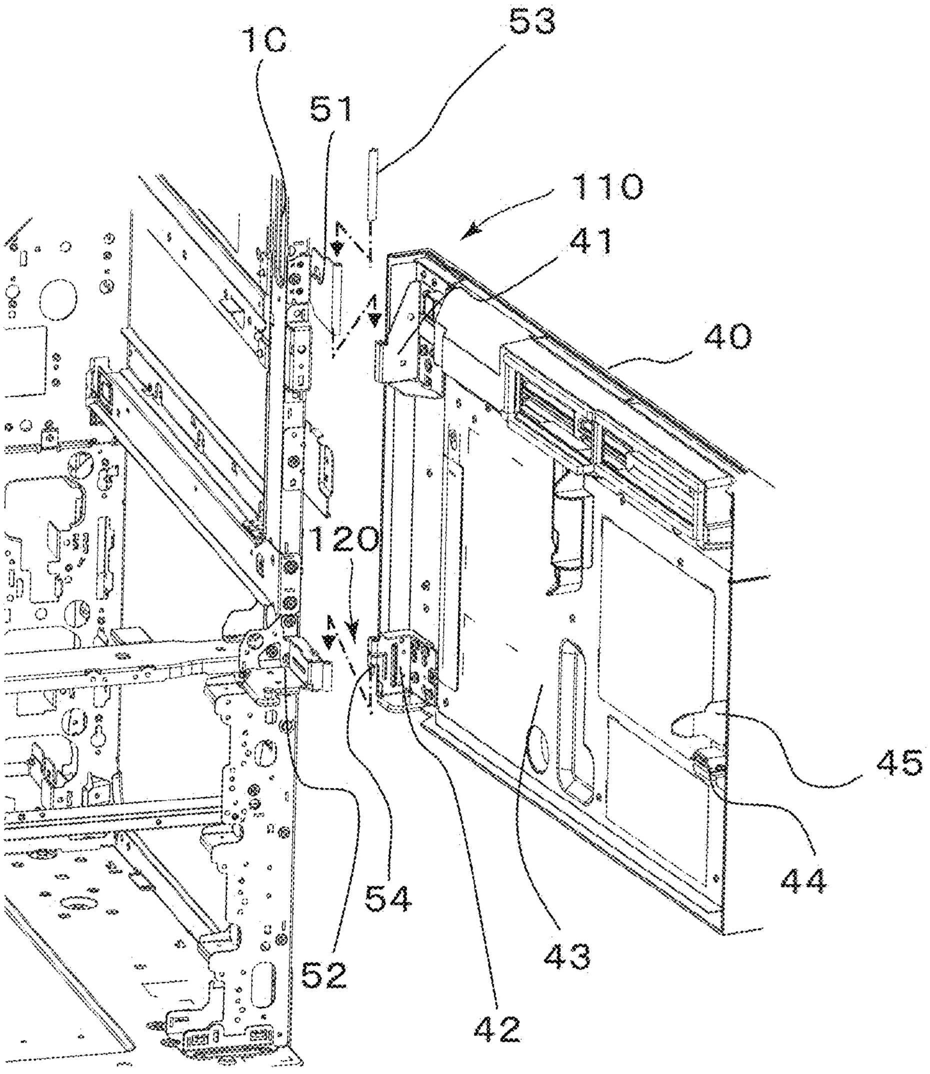
FIG. 4 is a view for describing an outline of a hinge mechanism.

The front door 40 is provided to be pivotable in a direction of an arrow Aby hinge mechanisms 110 and 120 (see FIG. 4 described below). Since the front door 40 is openably provided in the apparatus body 1A, the operator can open the front door 40, pull out, for example, the image forming units SY to SK, the intermediate transfer belt unit 800, and the like accommodated in the apparatus body 1A to the outside of the apparatus body 1A, and clean and replace the image forming units SY to SK, the intermediate transfer belt unit 800, and the like. That is, it is possible to access the inside of the image forming apparatus by opening the front door 40.

Figure 3A:
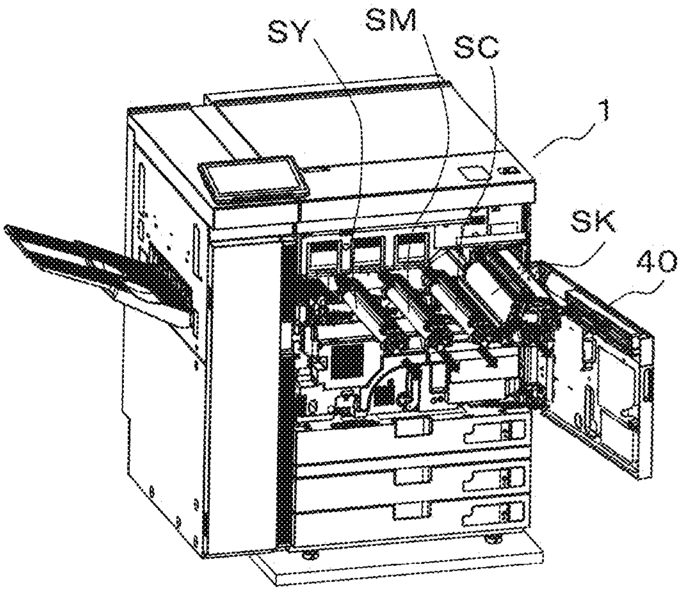
FIG. 3A is a perspective view illustrating a state where an image forming unit is pulled out.
Figure 3B:
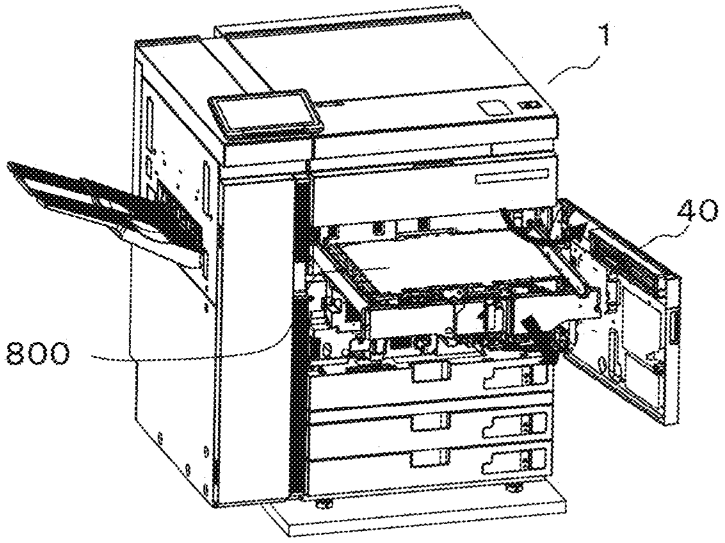
FIG. 3B is a perspective view illustrating a state where an intermediate transfer belt unit is pulled out.

FIG. 3A illustrates a state where the image forming units SY to SK are pulled out from the apparatus body 1A, and FIG. 3B illustrates a state where the intermediate transfer belt unit 800 is pulled out from the apparatus body 1A after the image forming units SY to SK are removed. In a case where the image forming units SY to SK, the intermediate transfer belt unit 800, and the like can be pulled out to the front of the apparatus as described above, the operator can easily access each unit.

In the present embodiment, the front door 40 is openably provided in the apparatus body 1A by using the hinge mechanism (110 and 120). An outline of the hinge mechanism (110 and 120) will be described with reference to FIG. 4. As illustrated in FIG. 4, in the present embodiment, the front door 40 is pivotably provided in the apparatus body 1A by two hinge mechanisms (110 and 120) disposed vertically above and below. In the hinge mechanism (110 or 120), a support plate (51 or 52) serving as a first support portion attached to a frame 1C of the apparatus body 1A and a hinge plate (41 or 42) serving as a second support portion (hinge portion) attached to the front door 40 pivot with a rod-like hinge pin (53 or 54) as a pivot shaft. Accordingly, the front door 40 pivots with respect to the apparatus body 1A. The operator can attach and detach the front door 40 to and from the apparatus body 1A by inserting and removing the hinge pins (53 and 54) of the hinge mechanisms (110 and 120). That is, the front door is supported by connecting the second support portion to the first support portion so as to be pivotable about the pivot shaft.

The support plates (51 and 52) and the hinge plates (41 and 42) are preferably formed so as to secure an opening area that prevents pulling of the image forming units SY to SK and the intermediate transfer belt unit 800 from the apparatus body 1A from being hindered when the front door 40 is opened. In the present embodiment, the support plates (51 and 52) and the hinge plates (41 and 42) are formed to have the same thickness as the thickness of the frame 1C to which the support plates (51 and 52) are attached in order to reduce a projected area from a front surface side as much as possible. In the present embodiment, the hinge mechanisms (110 and 120) are disposed at two upper and lower positions for grounding described below and for securing stiffness and strength enough to support the heavy front door 40 with the support plates (51 and 52) and the hinge plates (41 and 42) having a small thickness. Therefore, when the front door 40 is heavier, more hinge mechanisms may be provided.

Holding Mechanism

In the present embodiment, a holding mechanism for holding of the front door 40 in a closed state onto the apparatus body 1A when the front door 40 is closed is provided. As the holding mechanism, a known holding mechanism may be used. As an example, a holding mechanism that holds the front door by using a magnet will be described with reference to FIGS. 5A and 5B while referring to FIG. 4.

Figure 5A:
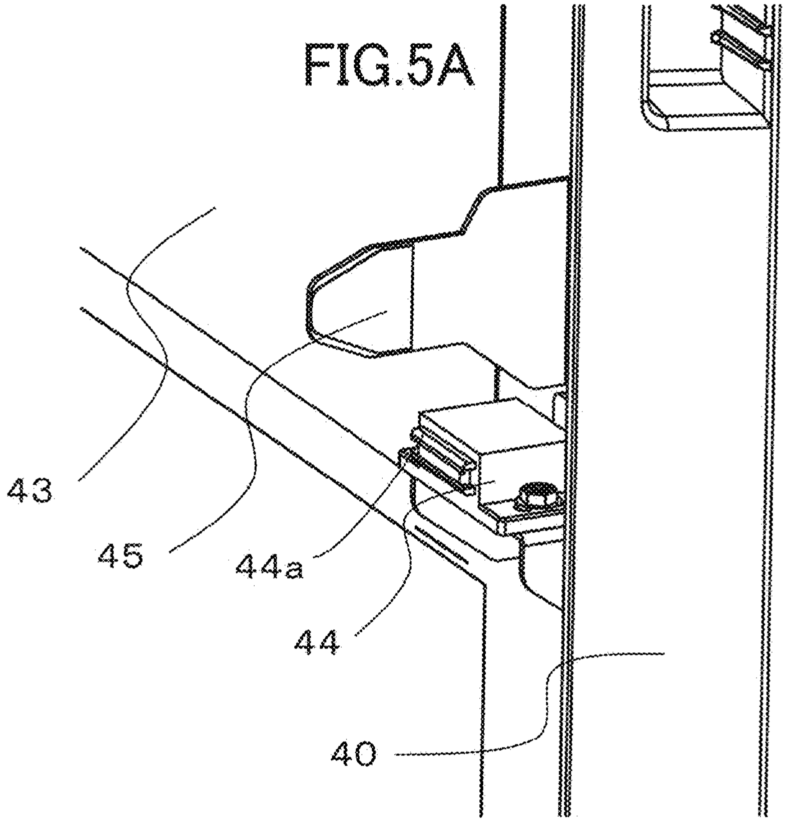
FIG. 5A is an enlarged view illustrating a magnet catch portion and a door switch plate.

The holding mechanism according to the present embodiment includes a magnet catch portion 44 and an attracting portion 56 serving as a pair of holding portions. As illustrated in FIG. 4, in the front door 40, the hinge plates (41 and 42) are provided on one end portion side and the magnet catch portion 44 is provided on the other end portion side (free end portion side) with respect to a width direction orthogonal to a pivot axis of the hinge pins (53 and 54). As illustrated in FIG. 5A, the magnet catch portion 44 includes a magnet 44*a*.

Figure 5B:
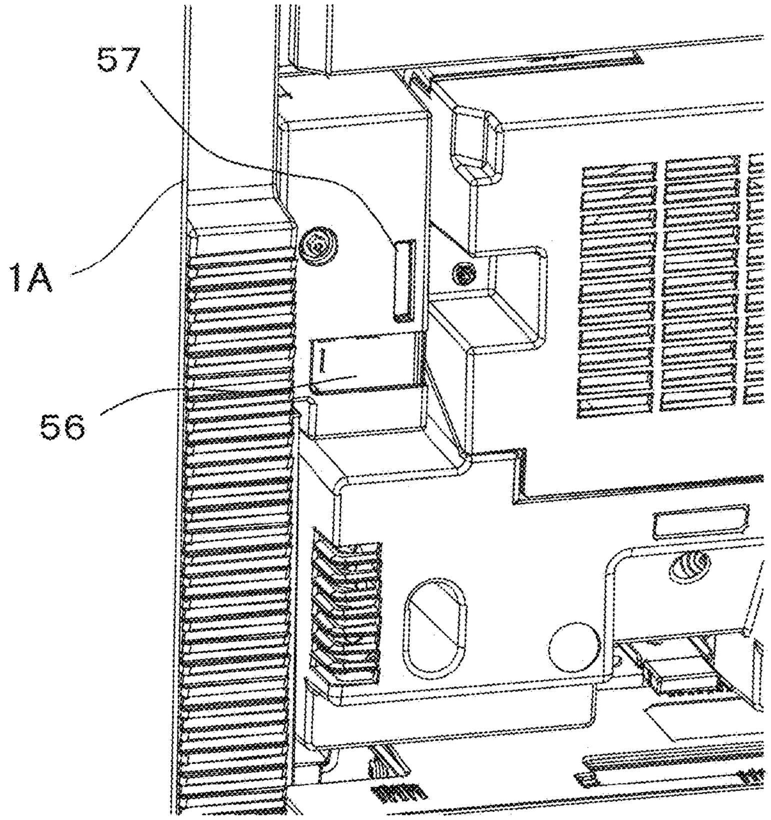
FIG. 5B is an enlarged view illustrating an attracting portion and an insertion portion.

Meanwhile, as illustrated in FIG. 5B, the apparatus body 1A is provided with, for example, the attracting portion 56 made of iron. The attracting portion 56 is disposed at a position where the magnet 44*a* of the magnet catch portion 44 provided on the front door 40 comes into contact in a state where the front door 40 is closed. When the magnet 44*a* comes into contact with the attracting portion 56, the magnet 44*a* sticks to the attracting portion 56 by a magnetic force. As a result, the front door 40 is held onto the apparatus body 1A in a closed state unless pulled by a force equal to or greater than the magnetic force of the magnet 44*a*.

As illustrated in FIG. 5A, a door switch plate 45 protruding inward from the back surface of the front door 40 may be provided above the magnet catch portion 44 on the free end portion side of the front door 40. As illustrated in FIG. 5B, the apparatus body 1A is provided with an insertion portion 57 having an insertion port into which a distal end of the door switch plate 45 is inserted in a state where the front door 40 is closed. A sensor (not illustrated) capable of detecting that the door switch plate 45 is inserted into the insertion port is provided in the insertion portion 57. With the sensor, it is possible to detect that the front door 40 is in a closed state.

Grounding

Figure 6:
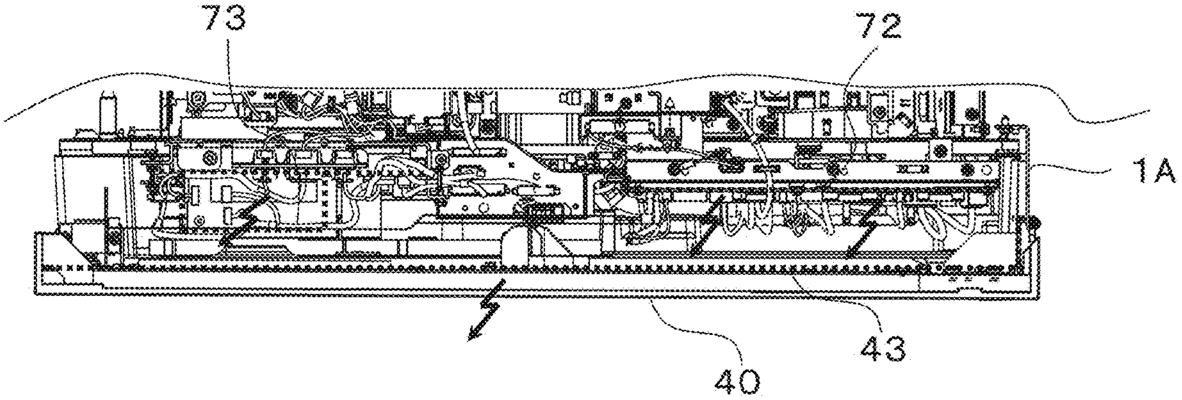
FIG. 6 is a top cross-sectional view illustrating an inner side of a reinforcing sheet metal in a state where the front door is closed.

As described above, in the present embodiment, the reinforcing sheet metal 43 is attached to the back surface of the front door 40 made of a resin. In recent years, in order to achieve further size reduction, a distance between the reinforcing sheet metal 43 and an electronic substrate 72 on which an electronic component is mounted such as a driver substrate, a motor 73, or the like provided in the apparatus body 1A in a state where the front door 40 is closed as illustrated in FIG. 6 is reduced. In this case, when grounding of the reinforcing sheet metal 43 is unstable, the reinforcing sheet metal 43 becomes an antenna of radiation noise, and there is a possibility that the radiation noise generated from the electronic component on the electronic substrate 72, the motor 73, or the like is relayed, and other electronic components are erroneously operated.

Therefore, in general, a conductive member included in a product needs to be grounded to be electrically stabilized. However, it is difficult to prevent the conductive member having a large area from becoming an antenna of radiation noise only by grounding the conductive member at one point to equalize a potential of the conductive member with the ground level, and it is necessary to ground the conductive member at a plurality of points to prevent the conductive member from becoming an antenna of radiation noise. In a case where the reinforcing sheet metal 43, which is a conductive member having a large area, is disposed on the front door 40 as in the present embodiment, grounding the reinforcing sheet metal 43 at a plurality of points is preferable because the reinforcing sheet metal 43 does not serve as an antenna for radiation noise, and a shielding effect against radiation noise is obtained. On the other hand, if the reinforcing sheet metal 43 cannot be grounded at a plurality of points with respect to the apparatus body 1A, the reinforcing sheet metal 43 may become an antenna of radiation noise and a source of radiation noise. Therefore, in consideration of grounding of the reinforcing sheet metal 43 provided on the front door 40 pivotably supported by the apparatus body 1A, grounding at a plurality of points (here, two points) of the hinge mechanism (110 and 120) is preferable because it is not necessary to separately provide a member for grounding.

However, in the case of grounding via the hinge mechanisms (110 and 120), how the load is applied by the front door 40 to the hinge mechanisms (110 and 120) affects the grounding. Hitherto, in some cases, the grounding by the upper hinge mechanism is not stabilized, and the reinforcing sheet metal 43 is grounded substantially only at one point by the lower hinge mechanism, depending on how the load is applied to the hinge mechanisms by the front door 40. Here, how the load is applied to the hinge mechanisms (110 and 120) by the front door 40 will be described with reference to FIGS. 7A to 8C.

Figure 7A:
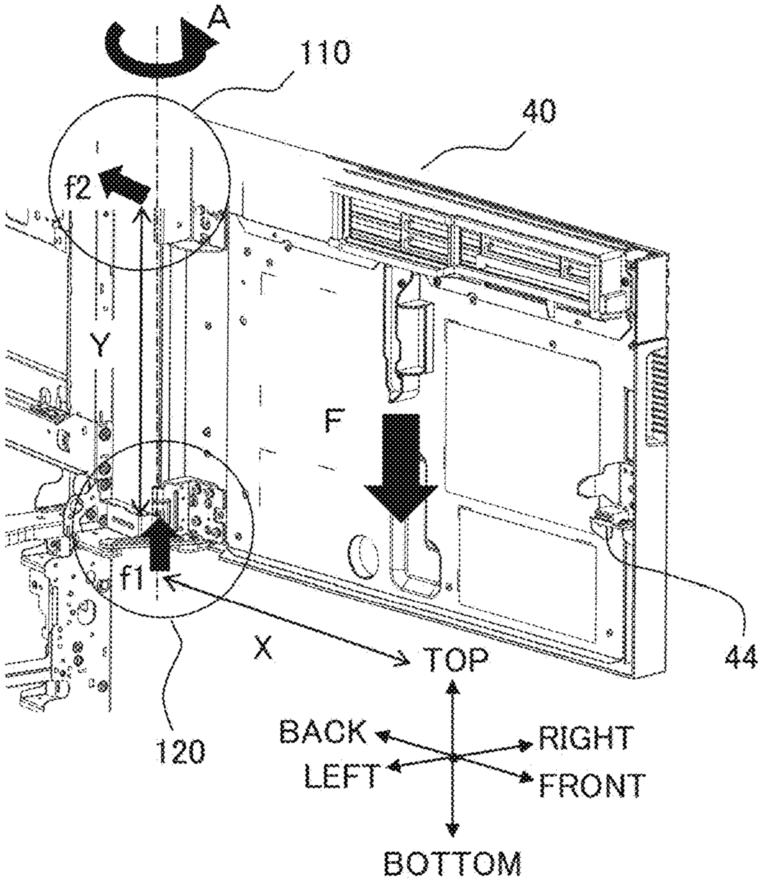
FIG. 7A is a view for describing a load applied when the front door is opened.
Figure 7B:
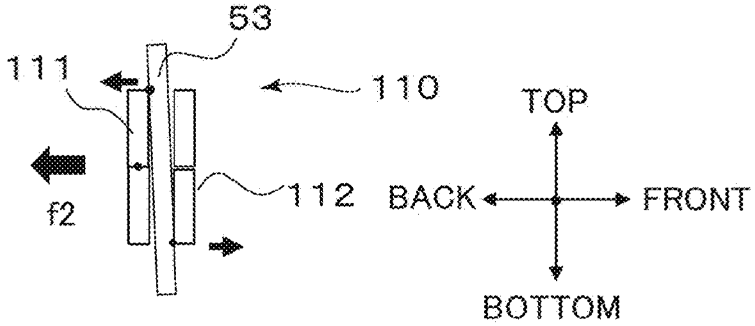
FIG. 7B is a view for describing a load applied to an upper hinge mechanism.
Figure 7C:
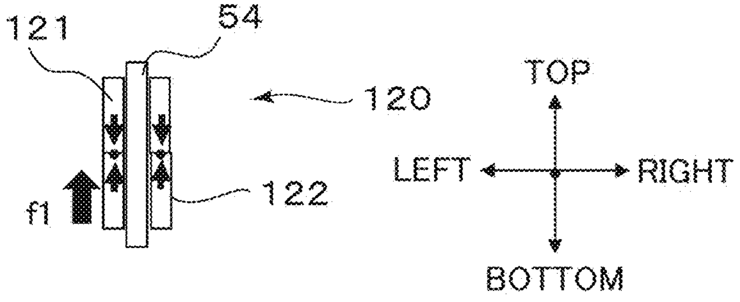
FIG. 7C is a view for describing a load applied to a lower hinge mechanism.
Figure 8A:
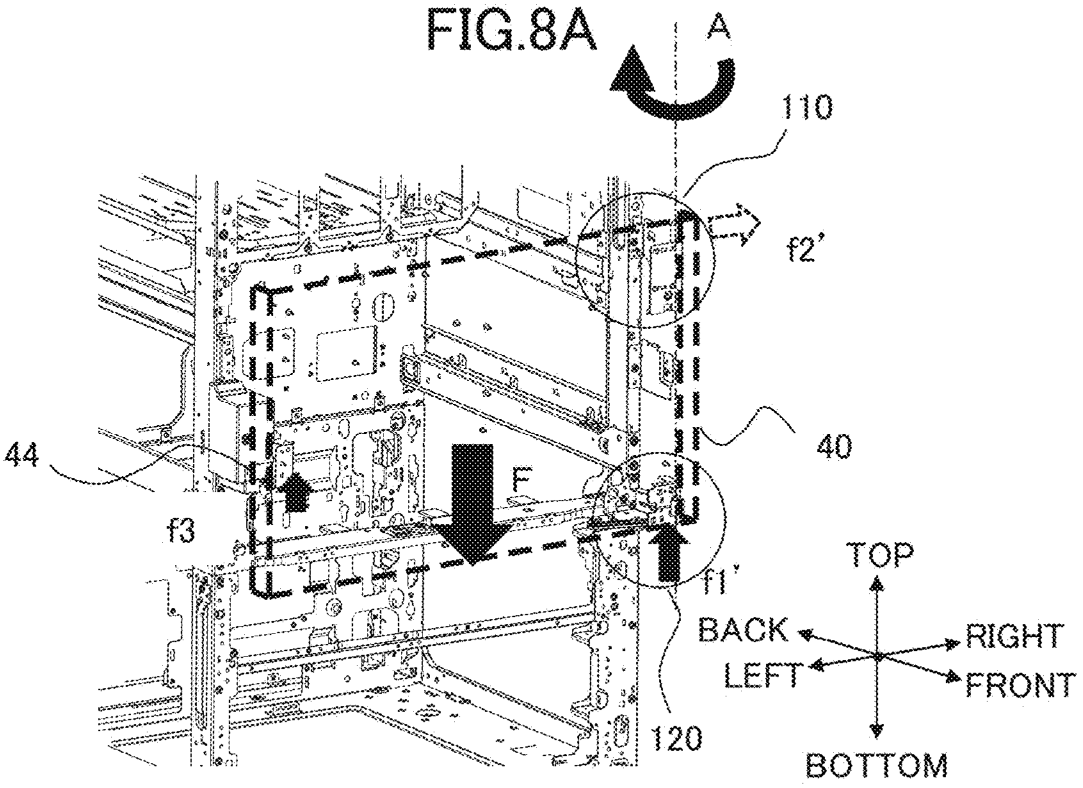
FIG. 8A is a view for describing a load applied to the hinge mechanisms when the front door is closed.
Figure 8B:
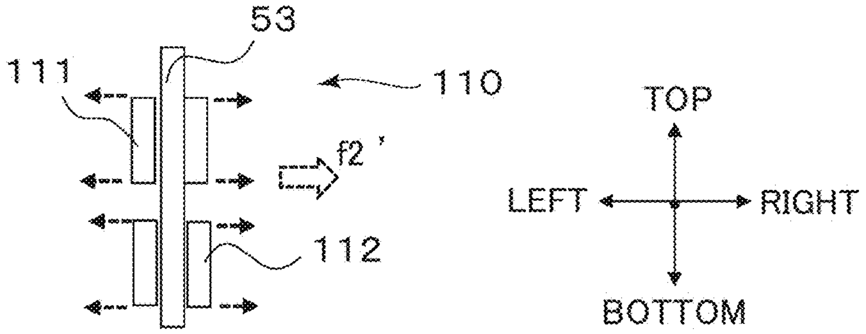
FIG. 8B is a view for describing a load applied to the upper hinge mechanism.
Figure 8C:
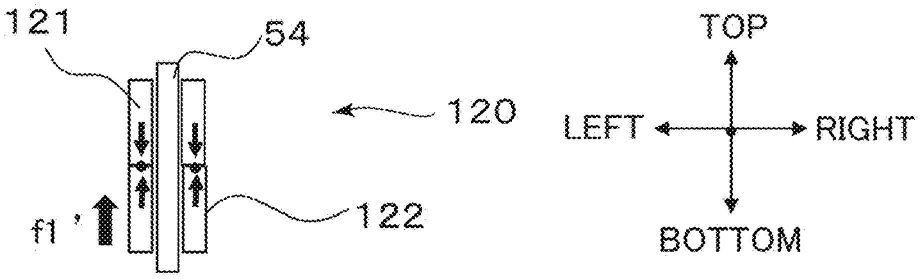
FIG. 8C is a view for describing a load applied to the lower hinge mechanism.

FIG. 7A is a view for describing the load applied to the hinge mechanisms (110 and 120) when the front door 40 is opened. FIG. 7B is a view for describing the load applied to the upper hinge mechanism 110 when the front door 40 is opened. FIG. 7C is a view for describing the load applied to the lower hinge mechanism 120 when the front door 40 is opened. FIG. 8A is a view for describing the load applied to the hinge mechanisms (110 and 120) when the front door 40 is closed. FIG. 8B is a view for describing the load applied to the upper hinge mechanism 110 when the front door 40 is closed. FIG. 8C is a view for describing the load applied to the lower hinge mechanism 120 when the front door 40 is closed.

In a state where the front door 40 is opened, as illustrated in FIG. 7A, a load F applied to the center of gravity of the front door 40 is supported by a load f1 applied to the lower hinge mechanism 120 in a vertical direction and a load f2 applied to the upper hinge mechanism 110 in a horizontal direction. The load f2 in the horizontal direction is a load of a moment about the lower hinge mechanism 120, and is obtained by a distance X from the center of gravity of the front door 40 to the hinge mechanism 120 and a distance Y from the hinge mechanism 120 to the hinge mechanism 110. In a state where the front door 40 is opened, the load f2 is applied to an upper tubular portion 111 and a lower tubular portion 112 of the hinge mechanism 110 as illustrated in FIG. 7B, and the load f1 is applied to an upper tubular portion 121 and a lower tubular portion 122 of the hinge mechanism 120 as illustrated in FIG. 7C, so that a sufficient load as an electrical contact pressure is applied to both of the hinge mechanisms 110 and 120.

On the other hand, in a state where the front door 40 is closed, as illustrated in FIG. 8A, the load F applied to the center of gravity of the front door 40 is supported by a load f1' applied to the lower hinge mechanism 120 in the vertical direction, a load f3 applied to the magnet catch portion 44 in the vertical direction, and a load f2' applied to the upper hinge mechanism 110 in the horizontal direction. When the front door 40 is closed, the load f2 applied to the hinge mechanism 110 in the horizontal direction in a state where the front door 40 is opened is partially offset by a moment in the opposite direction received from the load f3, and becomes the low load f2' (see FIG. 7A). In this way, in a state where the front door 40 is closed, the load f2' is applied to the upper tubular portion 111 and the lower tubular portion 112 of the hinge mechanism 110 as illustrated in FIG. 8B, and the load f1' is applied to the upper tubular portion 121 and the lower tubular portion 122 of the hinge mechanism 120 as illustrated in FIG. 8C. In this case, in the upper hinge mechanism 110, a gap is formed between a lower end surface of the upper tubular portion 111 and an upper end surface of the lower tubular portion 112 as illustrated in FIG. 8B, and it is thus difficult to obtain an electrically sufficient contact pressure.

Hinge Mechanism

Figure 9A:
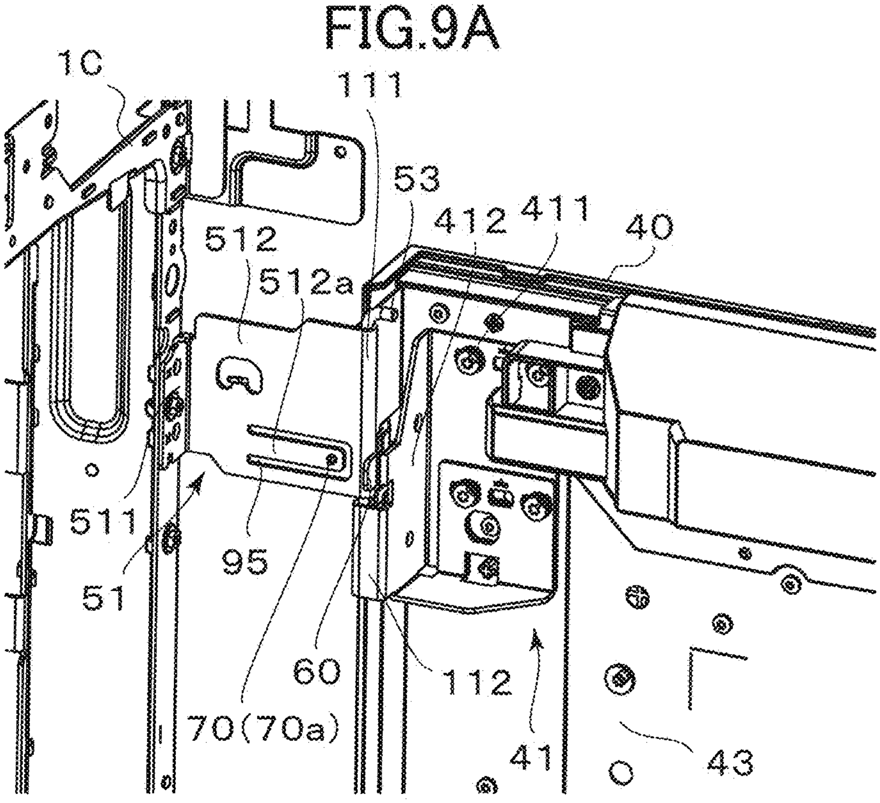
FIG. 9A is a perspective view illustrating the hinge mechanism according to a first embodiment in a state where the front door is opened.

Therefore, in the present embodiment, it is possible to stably ensure the grounding via the hinge mechanisms (110 and 120) regardless of how the load is applied by the front door 40 in a state where the front door 40 is closed. Hereinafter, the hinge mechanism 110 according to the present embodiment will be described using FIGS. 9A and 9B as an example. FIG. 9A illustrates a state where the front door 40 is opened, and FIG. 9B illustrates a state where the front door 40 is closed.

Figure 9B:
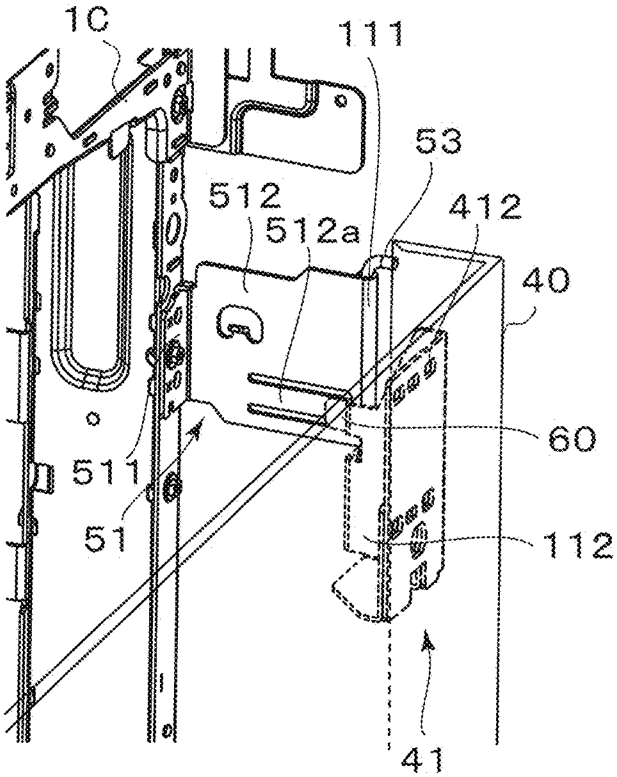
FIG. 9B is a perspective view illustrating the hinge mechanism according to the first embodiment in a state where the front door is closed.

As illustrated in FIGS. 9A and 9B, the support plate 51 is formed in a substantially L shape by press working, for example, and includes a body side fixed portion 511 serving as a first fixed portion fixed to the frame 1C, the cylindrical upper tubular portion 111 serving as a first fitting portion pivotably fitted to the hinge pin 53, and a body side plate-like portion 512 serving as a plate-like portion connecting the body side fixed portion 511 and the upper tubular portion 111. A fastening hole through which a fastening member such as a screw passes is formed in the body side fixed portion 511, and the body side fixed portion 511 is fixed to the frame 1C by the fastening member. The body side plate-like portion 512 extends toward a front surface of the apparatus body 1A at the body side fixed portion 511. The upper tubular portion 111 is formed by curling and bending one end portion of the body side plate-like portion 512 into a cylindrical shape.

Meanwhile, the hinge plate 41 is formed in a substantially L shape by general-purpose press work, and includes a door side fixed portion 411 serving as a second fixed portion fixed to the front door 40, the cylindrical lower tubular portion 112 serving as a second fitting portion provided coaxially with the upper tubular portion 111 and pivotably fitted to the hinge pin 53, and a door side plate-like portion 412 connecting the door side fixed portion 411 and the lower tubular portion 112. A fastening hole through which a fastening member such as a screw passes is formed in the door side fixed portion 411, and the door side fixed portion 411 is fixed to the front door 40 by the fastening member so as to be conductively connected to the reinforcing sheet metal 43. In the present embodiment, the support plate 51 and the hinge plate 41 are fixed such that the upper tubular portion 111 of the support plate 51 is positioned vertically above the lower tubular portion 112 of the hinge plate 41. The lower tubular portion 112 is formed by curling and bending one end portion of the door side plate-like portion 412 into a cylindrical shape. The door side plate-like portion 412 pivots with respect to the body side plate-like portion 512 using the hinge pin 53 inserted into the upper tubular portion 111 and the lower tubular portion 112 as a pivot shaft, whereby the front door 40 is opened and closed. It is sufficient if at least one of the upper tubular portion 111 or the lower tubular portion 112 is pivotable with the hinge pin 53, and the other may be fitted so as to be integrated with the hinge pin 53.

In the present embodiment, the hinge plate 41 includes a conductive contact portion 60, and the support plate 51 includes a conductive contact target portion 70 that can come into contact with the contact portion 60. The contact portion 60 and the contact target portion 70 come into contact with each other when the front door 40 is closed, and the contact portion 60 is provided in the door side plate-like portion 412 and the contact target portion 70 is provided in the body side plate-like portion 512 such that the contact portion 60 and the contact target portion 70 are separated from each other when the front door 40 is opened. The contact portion 60 is formed in a long beam shape in the door side plate-like portion 412, and a contact surface that comes into contact with the contact target portion 70 is formed at a distal end portion bent in a crank shape toward the outside of the front door 40 in a width direction of the front door 40.

As illustrated in FIG. 9B, the contact portion 60 abuts on and comes into contact with the contact target portion 70 when the front door 40 is closed. When the contact portion 60 comes into contact with the contact target portion 70, the contact target portion 70 is elastically deformed and comes into contact with the contact portion 60 at a constant contact pressure. To this end, the body side plate-like portion 512 is formed with an elastic deformation portion **512*a* that elastically deforms by being brought into contact with the contact portion 60**.

In the present embodiment, the elastic deformation portion **512*a* is a region surrounded by a slit 95 formed in a concave shape at a part of the body side plate-like portion 512. The elastic deformation portion 512*a* is formed such that an elastic deformation amount is larger on an upper tubular portion 111 side than on a body side fixed portion 511 side, and a distal end portion of the elastic deformation portion 512*a* on the upper tubular portion 111 side is the contact target portion 70. Even in a case where the contact target portion 70 is provided at the distal end portion of the elastic deformation portion 512*a* formed by opening the slit 95 in the body side plate-like portion 512 in this manner, the slit 95 has a closed shape, and thus stiffness and strength necessary for supporting the front door 40, which is a basic function of the support plate 51**, are secured.

The elastic deformation portion **512*a* is formed in a long beam shape. As a result, even in a case where the support plate 51 is formed of a conductive member having no spring property, it is possible to generate a sufficient contact pressure with the contact portion 60 within a range of elastic deformation without being plastically deformed at the time of the contact of the contact portion 60. For example, in a case where the support plate 51 is formed of an electrogalvanized steel plate having a thickness of 1.6 mm, the elastic deformation portion 512*a* is formed in a beam shape having a length of about 30 mm and a width of 8 mm. Then, the amount of design interference of the contact portion 60 with the contact target portion 70 is set to about 0.2 mm to 0.7 mm. In such a case, by changing the amount of design interference of the contact portion 60 with the contact target portion 70, when the contact portion 60 comes into contact with the contact target portion 70, a contact pressure of "5 N to 18 N" can be generated while suppressing the deformation of the contact target portion 70 to be within the range of elastic deformation, so that a contact pressure sufficient for grounding can be secured. The amount of interference of the contact portion 60 with the contact target portion 70 can be adjusted by a length of a portion bent into a crank shape in the contact portion 60**.

It is preferable that a protruding portion **70*a* protruding from a surface of the elastic deformation portion 512*a* and coming into contact with the contact portion 60 is formed at the distal end portion of the elastic deformation portion 512*a* that is the contact target portion 70. By forming the protruding portion 70*a*, the amount of interference at the time of contact at a contact position between the contact portion 60 and the contact target portion 70 is stabilized. In addition, by forming the protruding portion 70*a*, the contact target portion 70** functions as a durable and stable contact.

Although an example in which the elastic deformation portion **512*a* that elastically deforms is formed in the body side plate-like portion 512 has been described here, the contact portion 60 of the hinge plate 41 may be formed to be elastically deformable. That is, any one of the support plate 51 and the hinge plate 41 may have an elastic deformation portion that elastically deforms when the contact portion 60 and the contact target portion 70** come into contact with each other.

As described above, in the present embodiment, the hinge plate 41 includes the conductive contact portion 60, the support plate 51 includes the conductive contact target portion 70 capable of coming into contact with the contact portion 60, and the contact portion 60 and the contact target portion 70 come into contact with each other when the front door 40 is closed and are separated from each other when the front door 40 is opened. When the contact portion 60 comes into contact with the contact target portion 70, the contact target portion 70 is elastically deformed and comes into contact with the contact portion 60 at a constant contact pressure. That is, in the present embodiment, in addition to grounding due to contact between the lower end surface of the upper tubular portion 111 of the support plate 51 and the upper end surface of the lower tubular portion 112 of the hinge plate 41 affected by how the load is applied by the front door 40 when the front door 40 is closed, grounding due to contact between the contact portion 60 provided in the door-side plate-like portion 412 and the contact target portion 70 provided in the body side plate-like portion 512 is ensured. Thus, even when the front door 40 is held by the holding mechanism in a closed state, grounding can be stably ensured via the conductive support plate 51 and the conductive hinge plate 41 for pivotably attaching the front door 40 to the apparatus body 1A.

Second Embodiment

Next, a hinge mechanism according to a second embodiment will be described with reference to FIGS. 10A to 11B. In the second embodiment, the same components as those of the first embodiment described above are denoted by the same reference numerals, and a description thereof will be simplified or omitted.

Figure 10A:
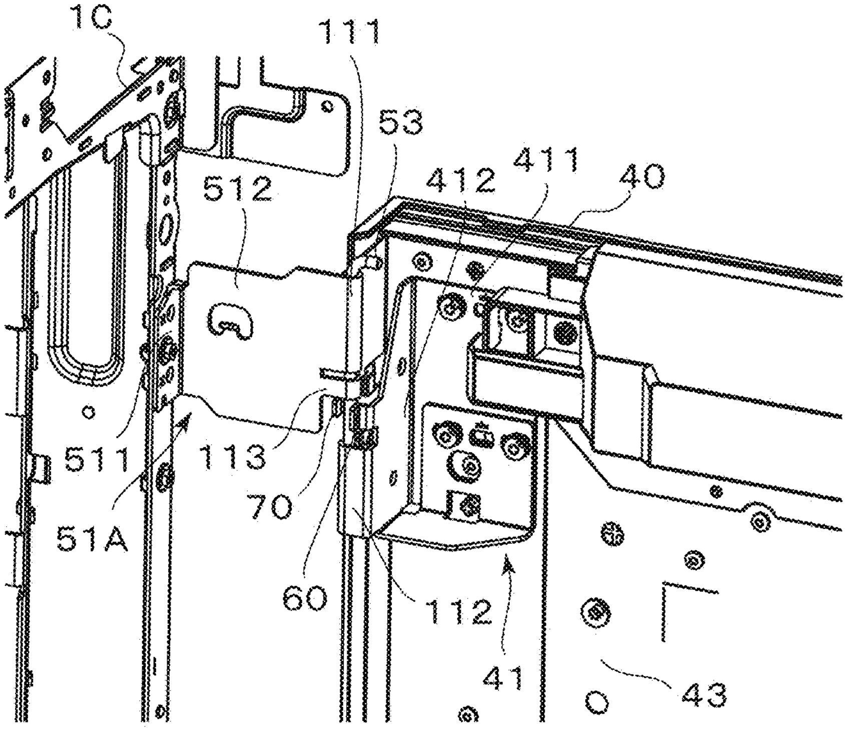
FIG. 10A is a perspective view illustrating a hinge mechanism according to a second embodiment in a state where a front door is opened.
Figure 10B:
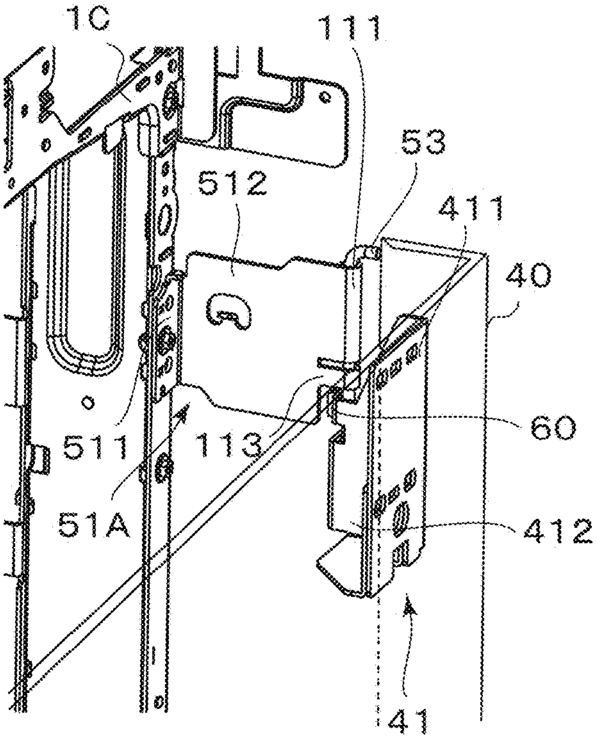
FIG. 10B is a perspective view illustrating the hinge mechanism according to the second embodiment in a state where the front door is closed.

As illustrated in FIGS. 10A and 10B, in the second embodiment as well, similarly to the first embodiment, a hinge plate 41 includes a conductive contact portion 60, and a support plate 51A has a conductive contact target portion 70 capable of coming into contact with the contact portion 60. The contact portion 60 may be provided in the hinge plate 41 on a front door 40 side as in the first embodiment, and the hinge plate 41 may have the same configuration as in the first embodiment. Similarly to the first embodiment, the contact target portion 70 and the contact portion 60 come into contact with each other in a state where a front door 40 is closed, and are separated from each other in a state where the front door 40 is opened. When the contact portion 60 comes into contact with the contact target portion 70, the contact target portion 70 is elastically deformed, comes into contact with the contact portion 60 at a constant contact pressure, and functions as an electrical contact.

Figure 11A:
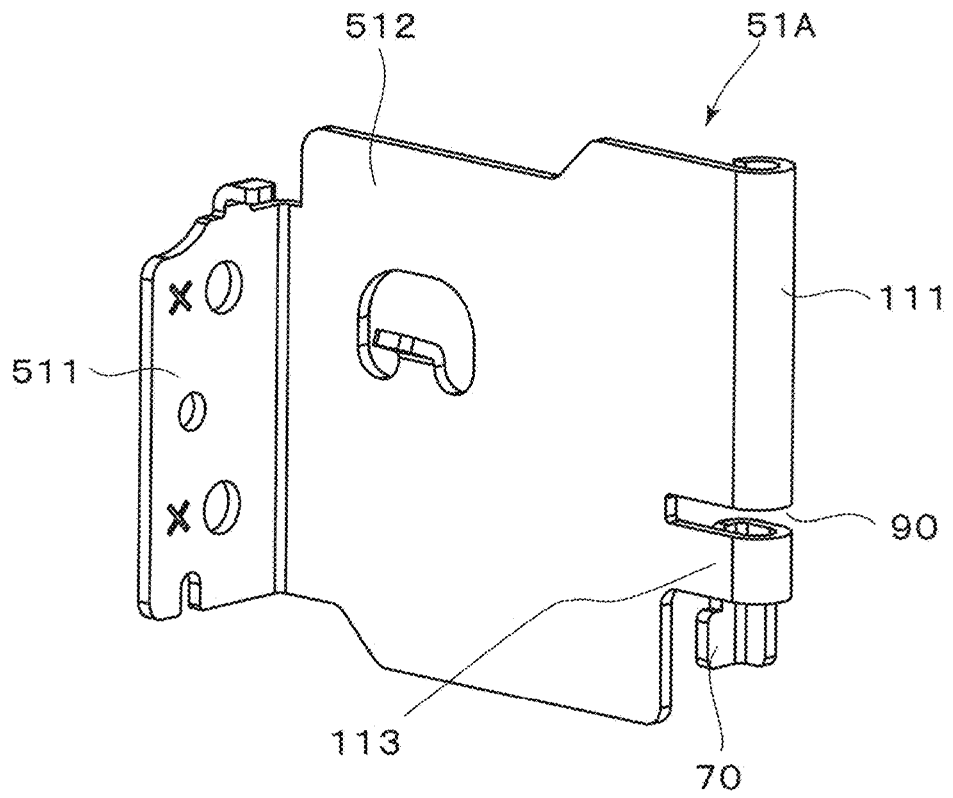
FIG. 11A is a perspective view illustrating an upper support plate according to the second embodiment when viewed from the inside.
Figure 11B:
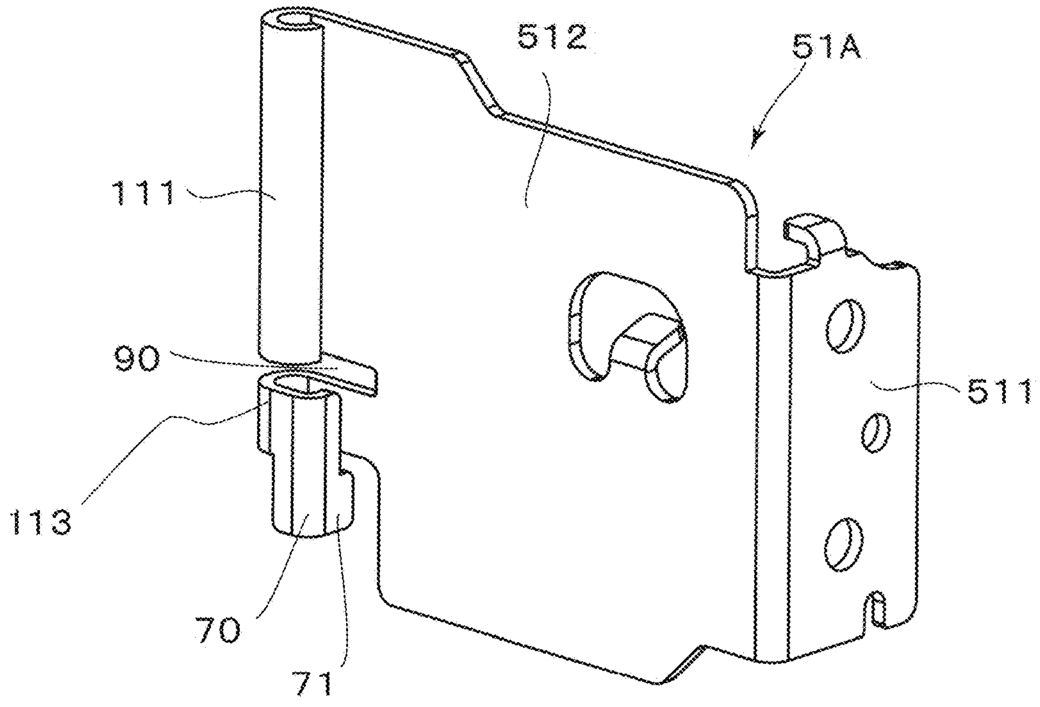
FIG. 11B is a perspective view illustrating the upper support plate according to the second embodiment when viewed from the outside.

However, in the second embodiment, unlike the first embodiment, the contact target portion 70 is formed not in a body side plate-like portion 512 of the support plate 51A but in an intermediate tubular portion 113 provided vertically below an upper tubular portion 111 such that a hinge pin 53 can be fitted. As illustrated in FIGS. 11A and 11B, the intermediate tubular portion 113 serving as a third fitting portion is formed by curling and bending one end portion of the body side plate-like portion 512 into a cylindrical shape coaxially with the upper tubular portion 111 while having a gap 90 from the upper tubular portion 111 in a vertical direction. The intermediate tubular portion 113 is formed in a beam shape whose length in the vertical direction is smaller than a length of the upper tubular portion 111 in the vertical direction. In the present embodiment, the contact target portion 70 is disposed below a curled portion of the body side plate-like portion 512 in the intermediate tubular portion 113.

As illustrated in FIG. 10B, the contact portion 60 abuts on and comes into contact with the contact target portion 70 when the front door 40 is closed. When the contact portion 60 comes into contact with the contact target portion 70, the intermediate tubular portion 113 is elastically deformed, and the contact portion 60 and the contact target portion 70 come into contact with each other at a constant contact pressure.

In the second embodiment, a surface of the contact target portion 70 with which the contact portion 60 comes into contact may be a contact target surface 71 illustrated in FIG. 11B. In this case, the contact portion 60 does not abut on the contact target portion 70 when the front door 40 is closed, and slides on the contact target surface 71 of the contact target portion 70. As the contact portion 60 slides on the contact target surface 71, the contact target portion 70 is elastically deformed, and the contact target portion 70 comes into contact with the contact portion 60 in an elastically deformed state. The contact target portion 70 is elastically deformed toward a door side plate-like portion 412 so as to come into contact with the contact portion 60 with a constant contact pressure in a state where the front door 40 is closed.

As described above, also in the second embodiment, similarly to the first embodiment, even when the front door 40 is held by a holding mechanism in a closed state, grounding can be stably ensured via the conductive support plate 51A and the conductive hinge plate 41 for pivotably attaching the front door 40 to an apparatus body 1A. In the second embodiment, contact positions of the contact portion 60 and the contact target portion 70 can be closer to a pivot center than in the first embodiment. Therefore, a length from the pivot center to the contact portion 60 can be shortened, and an opening area of an opening portion 1B (see FIG. 2) that prevents pulling of image forming units SY to SK and an intermediate transfer belt unit 800 from the apparatus body 1A from being hindered when the front door 40 is opened can be secured.

In the first and second embodiments described above, the contact target portion 70 is provided in the support plate 51 (51A) on the apparatus body side, and the contact portion 60 is provided in the hinge plate 41 on the front door 40 side, but the present technology is not limited thereto. For example, the contact target portion 70 may be provided in the hinge plate 41, and the contact portion 60 may be provided in the support plate 51 (51A). In addition, the lower hinge mechanism 120 may have the same configuration as the upper hinge mechanism 110 described above, or both the hinge mechanisms 110 and 120 may have the same configuration as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-083038, filed May 19, 2023, which is hereby incorporated by reference herein in its entirety.

What is claimed is:

1. An image forming apparatus configured to form an image on a recording material, the image forming apparatus comprising:
- a conductive frame;
- a first support portion that is provided on the frame and is conductive to the frame;
- a door configured to be opened such that an inside of the image forming apparatus is accessed, wherein the door includes:
  - a metal portion;
  - a second support portion that is conductive to the metal portion, is pivotably connected to the first support portion about a pivot shaft, and is configured to support the door; and
  - a contact portion that is conductive to the metal portion and comes into contact with and is conductive to the first support portion in a case where the door is in a closed state; and
- a holding mechanism configured to hold the door in the closed state.

2. The image forming apparatus according to claim 1, wherein the contact portion is provided in the second support portion.

3. The image forming apparatus according to claim 2, wherein the contact portion and the first support portion are separated from each other by opening the door in the closed state.

4. The image forming apparatus according to claim 1, wherein the first support portion includes an elastic deformation portion that elastically deforms in a case of coming into contact with the contact portion.

5. The image forming apparatus according to claim 4, wherein:
- the first support portion includes a first fixed portion fixed to the frame, a cylindrical first fitting portion fitted to the pivot shaft, and a plate-like portion connecting the first fixed portion and the first fitting portion, the second support portion includes a second fixed portion fixed to the door and a cylindrical second fitting portion provided coaxially with the first fitting portion and fitted to the pivot shaft, and a slit is provided at a part of the plate-like portion, and a region surrounded by the slit is the elastic deformation portion.

6. The image forming apparatus according to claim 4, wherein the elastic deformation portion includes a protruding portion that protrudes from a surface of the elastic deformation portion and comes into contact with the contact portion.

7. The image forming apparatus according to claim 4, wherein:

the first support portion includes:

a fixed portion fixed to the frame;

a cylindrical first fitting portion fitted to the pivot shaft;

a plate-like portion connecting the fixed portion and the cylindrical first fitting portion; and a cylindrical second fitting portion disposed on the plate-like portion coaxially with the cylindrical first fitting portion while providing a gap from the cylindrical first fitting portion and fitted to the pivot shaft, and the elastic deformation portion is provided in the cylindrical second fitting portion.

8. The image forming apparatus according to claim 1, wherein:

the door includes a non-conductive member, and the image forming apparatus further comprises a reinforcing sheet metal provided on an inner side of the door and configured to reinforce the door.

9. The image forming apparatus according to claim 1, wherein:

the holding mechanism includes a pair of holding portions configured to hold the door onto an apparatus body in the case where the door is in the closed state, the second support portion is provided on one end portion side of the door and one of the pair of holding portions is provided on the other end portion side of the door with respect to a direction orthogonal to a pivot axis of the pivot shaft, and the other of the pair of holding portions is provided on the apparatus body.

10. An image forming apparatus configured to form an image on a recording material, the image forming apparatus comprising:

a conductive frame;

a first support portion that is provided on the frame and is conductive to the frame;

a door configured to be opened such that an inside of the image forming apparatus is accessed, wherein the door includes:

a metal portion; and a second support portion that is conductive to the metal portion, is pivotably connected to the first support portion about a pivot shaft, and is configured to support the door; and a holding mechanism configured to hold the door in a closed state, wherein the first support portion includes a contact portion that comes into contact with and is conductive to the second support portion in a case where the door is in the closed state.

* * * * *